F. BETKER.
PISTON FOR EXPLOSION ENGINES.
APPLICATION FILED DEC. 8, 1919.

1,373,291.

Patented Mar. 29, 1921.

Inventors.
Frederick Betker
By
Wm. H. Monroe
Attorney

UNITED STATES PATENT OFFICE.

FREDERICK BETKER, OF CLEVELAND, OHIO.

PISTON FOR EXPLOSION-ENGINES.

1,373,291.   Specification of Letters Patent.   Patented Mar. 29, 1921.

Application filed December 8, 1919. Serial No. 343,442.

*To all whom it may concern:*

Be it known that I, FREDERICK BETKER, a citizen of the United States, and resident of Cleveland, in the county of Cuyahoga and State of Ohio, have invented certain new and useful Improvements in Pistons for Explosion-Engines, of which I hereby declare the following to be a full, clear, and exact description, such as will enable others skilled in the art to which it appertains to make and use the same.

The objects of the invention are to provide means for preventing the formation of carbon upon the inner face of the piston in an explosion engine.

This carbon when jarred by the vibration of the engine falls in flakes into the crank pit and is broken up and carried with the oil circulation into the engine bearings in hard gritty particles and causes them to overheat and burn out.

The carbon is derived from the oil splashed upon the inside of the piston as the cranks revolve in the crank case and which is charred by contact with the wall of the piston as it becomes superheated by the high temperature of the explosion in the cylinders.

The invention comprises an insulating agency interposed between the outer and inner surfaces of the head of the piston which prevents or retards the conduction of heat therethrough so that the temperature of the inner surface can never attain a sufficiently high degree to carbonize the oil splashed upon it.

The insulating agency preferably comprises closed chambers intermediate of the outer and inner surfaces of the piston head thus limiting the area of conducting metal to the thin marginal walls of the piston.

This chamber can be filled with heat resisting, and insulating material such as a paste of grease or mineral non heat conducting substances or metal alloys by means of which the temperature will be materially reduced at the inside surface of the piston head or the air can be exhausted to produce a vacuum in the cylinder head by means of which the very high temperature of the explosion end of the cylinder can be prevented from passing through the piston head.

Figure 1:
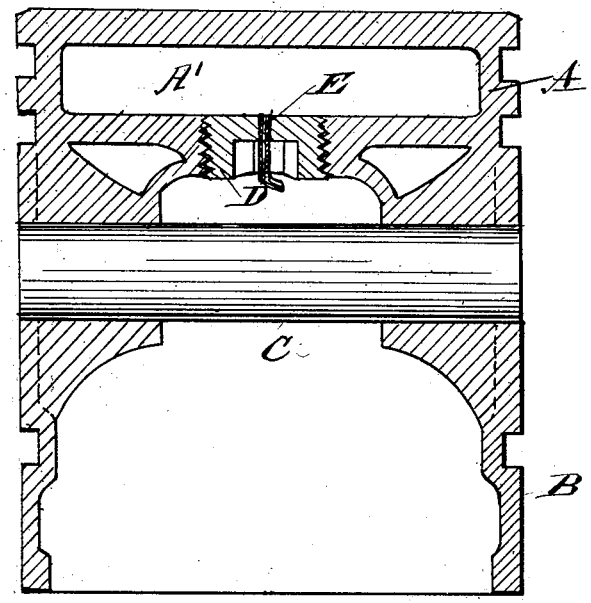
Figure 2:
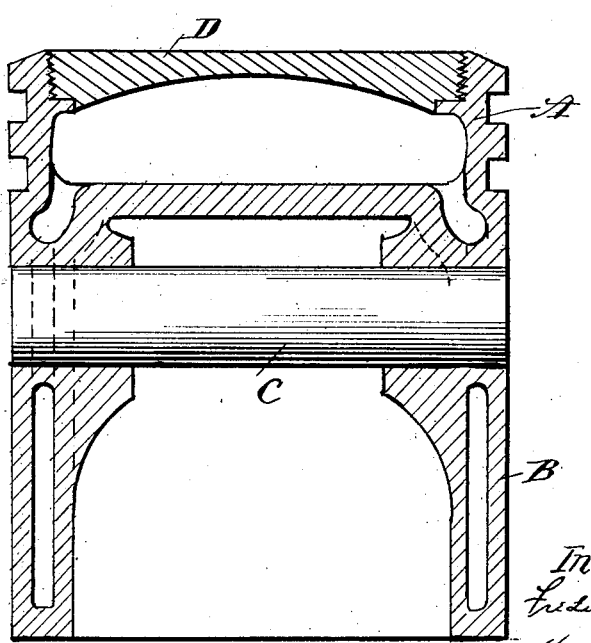

The invention is illustrated in the accompanying drawings, where Figure 1 is a longitudinal section of a piston head; Fig. 2 is a similar view showing the chamber extended upon the sides.

In these views A is the piston head; B, the skirt, C pivot pin, A' is a closed chamber in the piston head, which is provided with a closure, D, which must be air-tight in case a vacuum is to be produced in the chamber. E is a sealing tube, through which the air is drawn from this chamber when a vacuum is to be produced, and without which it would be impossible to produce a vacuum in the chamber.

In Fig. 1 the closure is placed in the inside wall of the chamber and in Fig. 2 in the outside wall. In Fig. 2 the sides of the chamber are continued down the sides or skirt of the piston thus materially cooling the inside wall surface.

Having described the invention what I claim as new and desire to secure by Letters Patent is:

1. In a piston for an explosion engine, a chamber in the head thereof intermediate the outer and inner surfaces, a closure for said chamber, and a sealing tube passing through said closure, through which air can be exhausted from said chamber.

2. In a piston for an explosion engine, a chamber in the head thereof, intermediate of its inner and outer surfaces said chamber continued into the sides of said piston, a closure for said chamber and a sealing tube for said closure.

In testimony whereof, I hereunto set my hand this 25" day of October, 1919.

FREDERICK BETKER.

In presence of—
WM. M. MONROE,
S. W. SANGSTER.